(12) United States Patent
Yamamoto

(10) Patent No.: US 8,115,839 B2
(45) Date of Patent: Feb. 14, 2012

(54) IMAGE SIGNAL PROCESSOR

(75) Inventor: Yasuhiro Yamamoto, Tokyo (JP)

(73) Assignee: Pentax Ricoh Imaging Company, Ltd, Tokyo (JP)

( * ) Notice: Subject to any disclaimer, the term of this patent is extended or adjusted under 35 U.S.C. 154(b) by 377 days.

(21) Appl. No.: 11/689,684

(22) Filed: Mar. 22, 2007

(65) Prior Publication Data

US 2007/0222874 A1    Sep. 27, 2007

(30) Foreign Application Priority Data

Mar. 23, 2006    (JP) ................. 2006-081246

(51) Int. Cl.
*H04N 5/335* (2011.01)
(52) U.S. Cl. ........... 348/280; 348/277
(58) Field of Classification Search .......... 348/280, 348/311; 250/208.1
See application file for complete search history.

(56) References Cited

U.S. PATENT DOCUMENTS

| | | | | |
|---|---|---|---|---|
| 5,034,907 A | * | 7/1991 | Johnson et al. | 708/319 |
| 5,748,829 A | | 5/1998 | Yamamoto et al. | |
| 5,812,731 A | | 9/1998 | Sato et al. | |
| 5,852,468 A | * | 12/1998 | Okada | 348/272 |
| 6,424,809 B1 | | 7/2002 | Yamamoto et al. | |
| 6,487,309 B1 | * | 11/2002 | Chen | 382/162 |
| 7,088,392 B2 | * | 8/2006 | Kakarala et al. | 348/272 |
| 2003/0193580 A1 | | 10/2003 | Okamoto | |
| 2004/0160521 A1 | | 8/2004 | Yamamoto | |
| 2006/0001747 A1 | | 1/2006 | Yamamoto | |
| 2006/0001929 A1 | | 1/2006 | Yamamoto | |

FOREIGN PATENT DOCUMENTS

| | | |
|---|---|---|
| JP | 2003-046876 | 2/2003 |
| JP | 2004-312140 | 11/2004 |

* cited by examiner

*Primary Examiner* — Jason Chan
*Assistant Examiner* — Yih-Sien Kao
(74) *Attorney, Agent, or Firm* — Greenblum & Bernstein, P.L.C.

(57) ABSTRACT

According to the present invention, an image signal processor, comprising a receiver, a mixing block, and an adjustment block, is provided. The receiver receives first, second, and third color pixel signals which an imaging device outputs. The mixing block generates first, second, and third color mixed pixel signals. The first, second, and third color mixed pixel signals are generated by mixing the first, second, and third color pixel signals generated by all the first, second, and third color pixels occupying a space of which the area is a second predetermined area whose the center is in agreement with the center of the first, second, and third color mixed pixel areas, respectively. The adjustment block adjusts the signal levels of the first, second, and third color mixed pixel signals based on first, second, and third pixel numbers.

8 Claims, 4 Drawing Sheets

IMAGE SIGNAL PROCESSOR

BACKGROUND OF THE INVENTION

1. Field of the Invention

The present invention relates to an image signal processor that mixes pixel signals generated by pixels covered with color filters arranged in a predetermined array.

2. Description of the Related Art

A multitude of pixels are arranged on a light-receiving surface of an imaging device. Each pixel is covered with a color filter. Certain types of color filters are arranged according to a predetermined array, such as Bayer color array. Each pixel generates a pixel signal according to the amount of a received light component that passes through the color filter. An image signal comprising a plurality of pixel signals is generated when the entire light-receiving surface receives an optical image of an object.

The pixel mixing process is known for the purpose of receiving an object even if an optical image of an object is dark. The pixel mixing process involves signal processing for mixing a plurality of pixel signals generated by pixels that are adjacent to one another. Even if the signal level of a singular pixel signal is low, the signal level of mixed pixel signals is enlarged by the pixel mixing process.

A prior pixel mixing process is explained below using FIGS. 3, 4. Incidentally, in FIG. 3, 4, the rows and columns of the pixel and mixed pixel area are counted from top to bottom and left to right, respectively.

A plurality of pixels are arranged in a matrix on the light-receiving surface. Red, green, and blue pixels $12rp$, $12gp$, $12bp$ are covered with red, green, and blue color filters, respectively. Hypothetical zones of red, green, and blue mixed pixel areas $12ar$, $12ag$, $12ab$ (2,2) are arranged in a matrix on the light-receiving surface. The red, green, and blue pixels $12pr$, $12pg$, $12pb$ are arranged according to the Bayer color array. Further, the red, green, and blue mixed pixel areas $12ar$, $12ga$, $12ab$ (2,2) are arranged according to the Bayer color array.

For example, the red mixed pixel area $12ar(1,1)$ is mapped so that the center of the red mixed pixel area $12ar(1,1)$ (see FIG. 4) agrees with the blue pixel $12pb(2,2)$ (see FIG. 3) arranged in the second row from top and second column from left, and its size is four times as large as that of one pixel. Further, the green mixed pixel area $12ag(1,2)$ is mapped so that the center of the green mixed pixel area $12ag(1,2)$ agrees with the blue pixel $12pb(2,4)$ and its size is four times as large as that of one pixel. Further, the blue mixed pixel area $12ab(2,2)$ is mapped so that the center of the blue mixed pixel area $12ab(2,2)$ agrees with the blue pixel $12pb(4,4)$ and its size is four times as large as that of one pixel.

When the pixel mixing process is carried out for the red, green, and blue pixel signals, the same number of red, green, and blue pixel signals are separately summed up.

For example, the red mixed pixel signal of the red mixed pixel area $12ar(1,1)$ is generated by mixing together four red pixel signals individually generated by the red pixel in the first row and first column $12pr(1,1)$, the red pixel in the first row and third column $12pr(1,3)$, the red pixel in the third row and first column $12pr(3,1)$, and the red pixel in the third row and third column $12pr(3,3)$.

Similarly, the green mixed pixel signal of the green mixed pixel area $12ag(1,2)$ is generated by mixing together four green pixel signals individually generated by the green pixel in the first row and fourth column $12pg(1,4)$, the green pixel in the second row and third column $12pg(2,3)$, the green pixel in the second row and fifth column $12pg(2,5)$, and the green pixel in the third row and fourth column $12pg(3,4)$.

Likewise, the blue mixed pixel signal of the blue mixed pixel area $12ab(2,2)$ is generated by mixing together four blue pixel signals individually generated by the blue pixel in the second row and fourth column $12pb(2,4)$, the blue pixel in the fourth row and second column $12pb(4,2)$, the blue pixel in the fourth row and sixth column $12pb(4,6)$, and the blue pixel in the sixth row and fourth column $12pb(6,4)$.]

According to the above prior pixel mixing process, the distance between the center of the mixed pixel area and the individual red, green, and blue pixels to be mixed together are different from each other. Consequently, the captured image may be blurred.

The distance from the center of the red mixed pixel area to the centers of the individual red pixels whose pixel signals are used for generating the red mixed pixel signal corresponds to 1.41 pixel lengths. The distance from the center of the green mixed pixel area to the centers of the individual green pixels whose pixel signals are used for generating the green mixed pixel signal corresponds to 1 pixel length. The distance from the center of the blue mixed pixel area to the centers of the individual blue pixels whose pixel signals are used for generating the blue mixed pixel signal corresponds to 2 pixel lengths. Because the distance for the blue is especially long, the blue component of the entire captured image will consequently be blurred more than the red and green components.

SUMMARY OF THE INVENTION

Therefore, an object of the present invention is to provide an image signal processor that carries out the pixel mixing process so that the blurring of any one specific color component is mitigated.

According to the present invention, an image signal processor, comprising a receiver, a mixing block, and an adjustment block, is provided. The receiver receives first, second, and third color pixel signals which an imaging device outputs. The first, second, and third color pixel signals are generated by first, second, and third color light components received, respectively. The first, second, and third color pixels are on a light-receiving surface of the imaging device arranged according to a predetermined color array. At least one of the first, second, and third numbers are different from the other numbers in the predetermined color array. The first, second, and third numbers are the numbers of the first, second, and third color pixels occupying a space of which the area is a first predetermined area whose center is in agreement with the first, second, and third color pixel, respectively. The mixing block generates first, second, and third color mixed pixel signals. The first, second, and third color mixed pixel signals corresponding to a magnitude of the first, second, and third color light components received by a first, second, and third color mixed pixel area, respectively. The first, second, and third color mixed pixel areas are arranged so that the first, second, and third color mixed pixel areas occupy spaces according to the predetermined color array. The first, second, and third color mixed pixel signals are generated by mixing the first, second, and third color pixel signals generated by all the first, second, and third color pixels occupying a space of which the area is a second predetermined area whose the center is in agreement with the center of the first, second, and third color mixed pixel areas, respectively. The adjustment block adjusts the signal levels of the first, second, and third color mixed pixel signals based on first, second, and third pixel numbers. The first, second, and third pixel numbers are the numbers of the first, second, and third color pixels used for the generation of the single first, second, and third color mixed pixel signals, respectively.

Further, the adjustment block adjusts the signal levels by dividing the first, second, and third mixed pixel signals by the first, second, and third pixel numbers, respectively.

Further, the mixing block generates the first, second, and third color mixed pixel signals by weighting the first, second, and third pixel signals generated by the first, second, and third color pixels, according to an inversely proportional relationship with respect to the distances between the first, second, and third color pixels and the centers of the first, second, and third color mixed pixel areas, respectively. The adjustment block adjusts the signal level by applying the weights of the first, second, and third color pixel signals to the first, second, and third pixel numbers.

According to the present invention, an image signal processor, comprising a receiver, a mixing block, and an adjustment block, is provided. The receiver receives first, second, and third color pixel signals which an imaging device outputs. The first, second, and third color pixel signals are generated by first, second, and third color pixels according to the magnitude of first, second, and third color light components received, respectively. The first, second, and third color pixels are on a light-receiving surface of the imaging device arranged according to the Bayer color array. The mixing block generates first, second, and third color mixed pixel signals. The first, second, and third color mixed pixel signals corresponds to the magnitude of the first, second, and third color light components received by first, second, and third color mixed pixel areas, respectively. The first, second, and third color mixed pixel areas are arranged so that they occupy spaces according to the Bayer color array and so that the centers of the first, second, and third color mixed pixel areas are in agreement with the center of the first color pixel. The first mixed pixel signal is generated by mixing together the first color pixel signal generated by the first color pixel that is in agreement with the center of the first color mixed pixel area with the first color pixel signals generated by the first color pixel occupying a surrounding space of which the area is a second predetermined area. The second and third color mixed pixel signals are generated by mixing together the second and third color pixel signals generated by the second and third color pixels occupying a space of which the area is the second predetermined area, respectively. The adjustment block adjusts the signal levels of the first, second, and third color mixed pixel signals based on first, second, and third pixel numbers. The first, second, and third pixel numbers are the numbers of the first, second, and third color pixels used for the generation of the single first, second, and third color mixed pixel signals, respectively.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
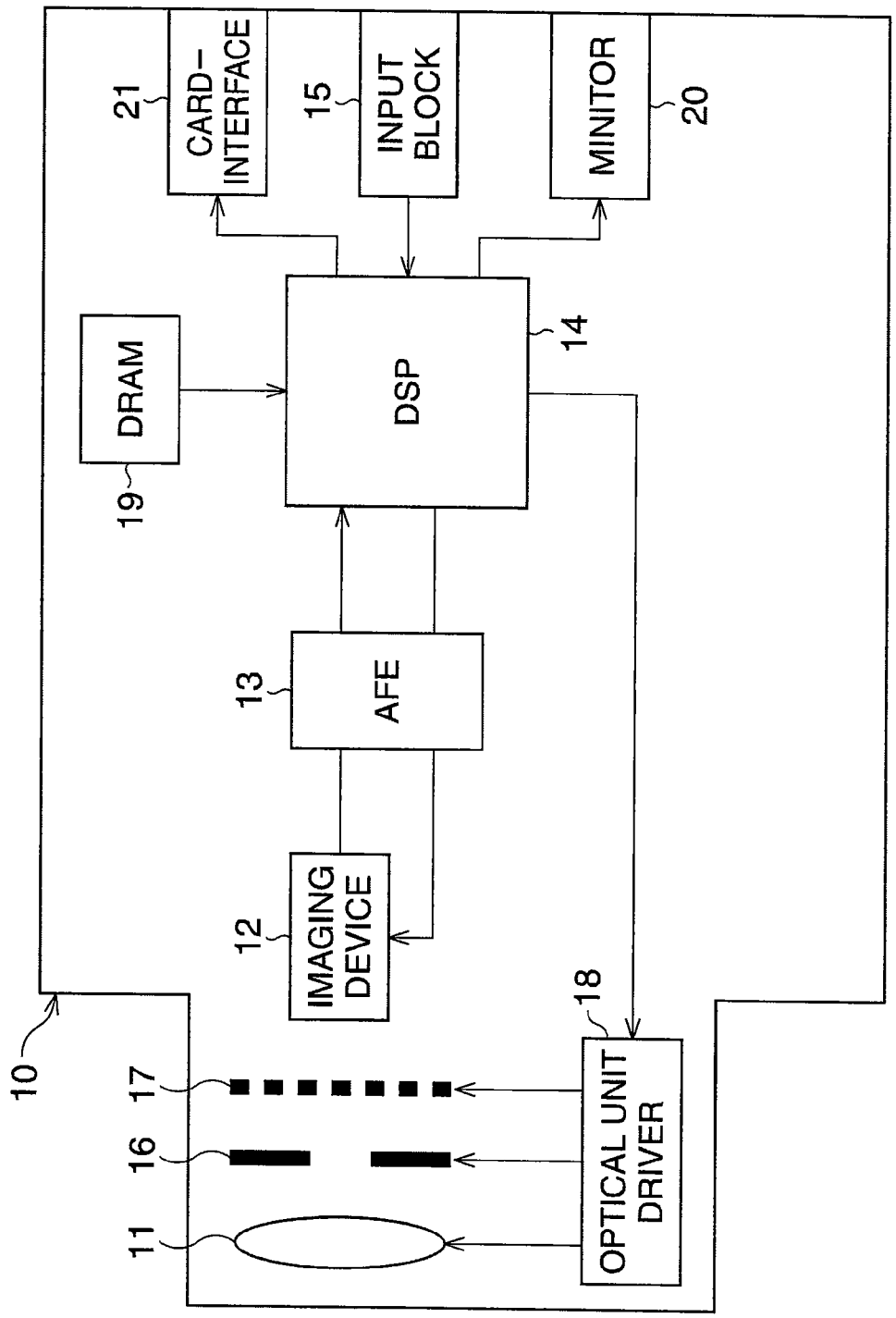
FIG. 1 is a block diagram of an embodiment of the present invention showing the internal structure of a digital camera having an image signal processor.

The present invention is described below with reference to the embodiment shown in the drawings.

In FIG. 1, a digital camera 10 comprises a photographic optical system 11, an imaging device 12, an analog front end (AFE) 13, a digital signal processor (DSP) 14, an input block 15, and other components.

The photographic optical system 11 is optically connected to the imaging device 12. An optical image of an object through the photographic optical system 11 is incident to the light-receiving surface of the imaging device 12. The imaging device 12 is, for example, a CCD area sensor. When the imaging device 12 captures the optical image of the object upon its light-receiving surface, the imaging device 12 generates an image signal corresponding to the captured optical image.

Figure 2:
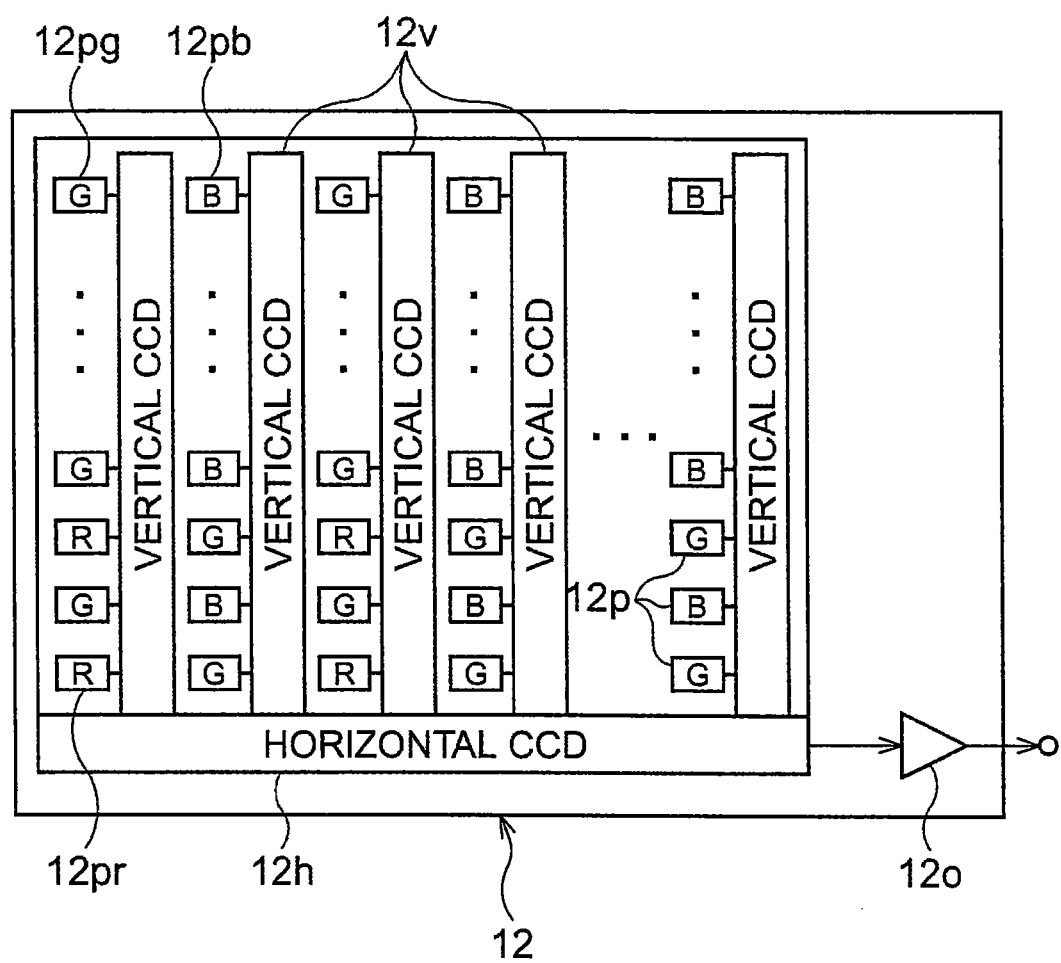
FIG. 2 is a block diagram showing the structure of the light-receiving surface of the imaging device.

As shown in FIG. 2, a plurality of pixels 12p are arranged in a matrix on the light-receiving surface of the imaging device 12. Each pixel 12p is covered with either a red, green, or blue color filter. The red, green, and blue color filters are arranged on the pixels in the matrix according to the Bayer color array. A red pixel 12pr, which is covered with a red color filter, generates a red signal charge according to the magnitude of a red light component received by the red pixel 12pr. A green pixel 12pg, which is covered with a green color filter, generates a green signal charge according to the magnitude of a green light component received by the green pixel 12pg. A blue pixel 12pb, which is covered with a blue color filter, generates a blue signal charge according to the magnitude of a blue light component received by the blue pixel 12pb.

A plurality of vertical CCDs 12v are mounted on the imaging device 12 along each column formed by the vertically arranged pixels 12p. A singular horizontal CCD 12h is mounted on the imaging device 12 at the bottom of the vertical CCDs 12v. The signal charge generated by each pixel 12pr, 12pg, 12pb is transferred to the horizontal CCD 12h from the vertical CCDs 12v. The signal charge transferred to the horizontal CCD 12h is next transferred to the output block 12o by the horizontal CCD 12h.

The output block 12o then converts the transferred signal charge into a pixel signal, which is a potential signal. The red, green, and blue signal charges are converted into red, green, and blue pixel signals, respectively. The aggregate red, green, and blue pixel signals generated during one frame period is output from the imaging device 12 as an image signal corresponding to an optical image of an object.

A diaphragm 16 and a shutter 17 are mounted between the photographic optical system 11 and the imaging device 12 (see FIG. 1). The intensity of light incident to the light-receiving surface of the imaging device 12 is adjusted by adjusting the aperture ratio of the diaphragm 16. An optical image reaches the light-receiving surface by the opening of the shutter 17, and an optical image is shielded from the light-receiving surface by the closing of the shutter 17. An optical unit driver 18 drives the diaphragm 16 so that the aperture ratio can be adjusted. Further, the optical unit driver 18 drives the shutter 17 so that the shutter 17 can be opened and closed.

The imaging device 12 is electrically connected to the DSP 14 via the AFE 13. A clock signal is sent from the DSP 14 to the AFE 13. The AFE 13 generates a frame signal and an imaging device driving signal based on the received clock signal. The imaging device driving signal is sent to the imaging device 12. Incidentally, the number of image captured per a unit of time is determined according to the frame signal. The imaging device 12 is driven, based on the imaging device driving signal, to generate an image signal that is synchronized with the frame signal.

The generated image signal is sent to the AFE 13, which carries out correlated double sampling and gain adjustment on the image signal. In addition, the image signal is converted into image data, which is digital data that is sent to the DSP 14.

The DSP 14 is connected to a dynamic random access memory (DRAM) 19, which is used as a work memory for the signal processing that carried out by the DSP 14. The image data received by the DSP 14 is temporarily stored in the DRAM 19.

The DSP 14 carries out predetermined data processing, such as the white balance processing and the color interpolation processing, on the image data stored in the DRAM 19. Incidentally, when high sensitivity photographing is carried out, as described later, the DSP 14 uses the image data stored in the DRAM 19 for the pixel mixing process.

The DSP 14 is connected to a monitor 20. The image data, having undergone predetermined signal processing, is sent to the monitor 20, which is able to display an image corresponding to the received image data.

The DSP 14 is connected to a card-interface 21 that can be connected to a memory card (not depicted). When a release operation is carried out, as described later, the image data, having undergone predetermined data processing, is stored in the memory card.

The DSP 14 is connected to the input block 15, where a user inputs operational commands. The input block 15 comprises a release button (not depicted), a multi-functional cross-key (not depicted), a power button (not depicted), and other buttons. The DSP 14 orders each component of the digital camera 10 to carry out a necessary operation according to a user's command input to the input block 15.

For example, by depressing the release button halfway, a first switch (not depicted) is switched on, and an exposure adjustment and focus adjustment are then carried out. In the exposure adjustment, an exposure value is detected based on the image data, and the DSP orders the optical unit driver 18 to adjust the aperture ratio of the diaphragm 16 and the shutter speed accordingly. In the focus adjustment, the DSP 14 orders the optical unit driver 18 to move the position of the focus lens that is included in the photographic optical system 11, along the optical axis of the photographic optical system 11.

Further, by fully depressing the release button a second switch (not depicted) is switched on, the shutter 17 is driven to open and close, and the imaging device 12 is driven to capture a static optical image.

Further, by inputting operational commands to the multi-functional cross-key, the ISO sensitivity can be adjusted. The DSP 14 commences the pixel mixing process based on an operational command to increase the ISO sensitivity.

Figure 3:
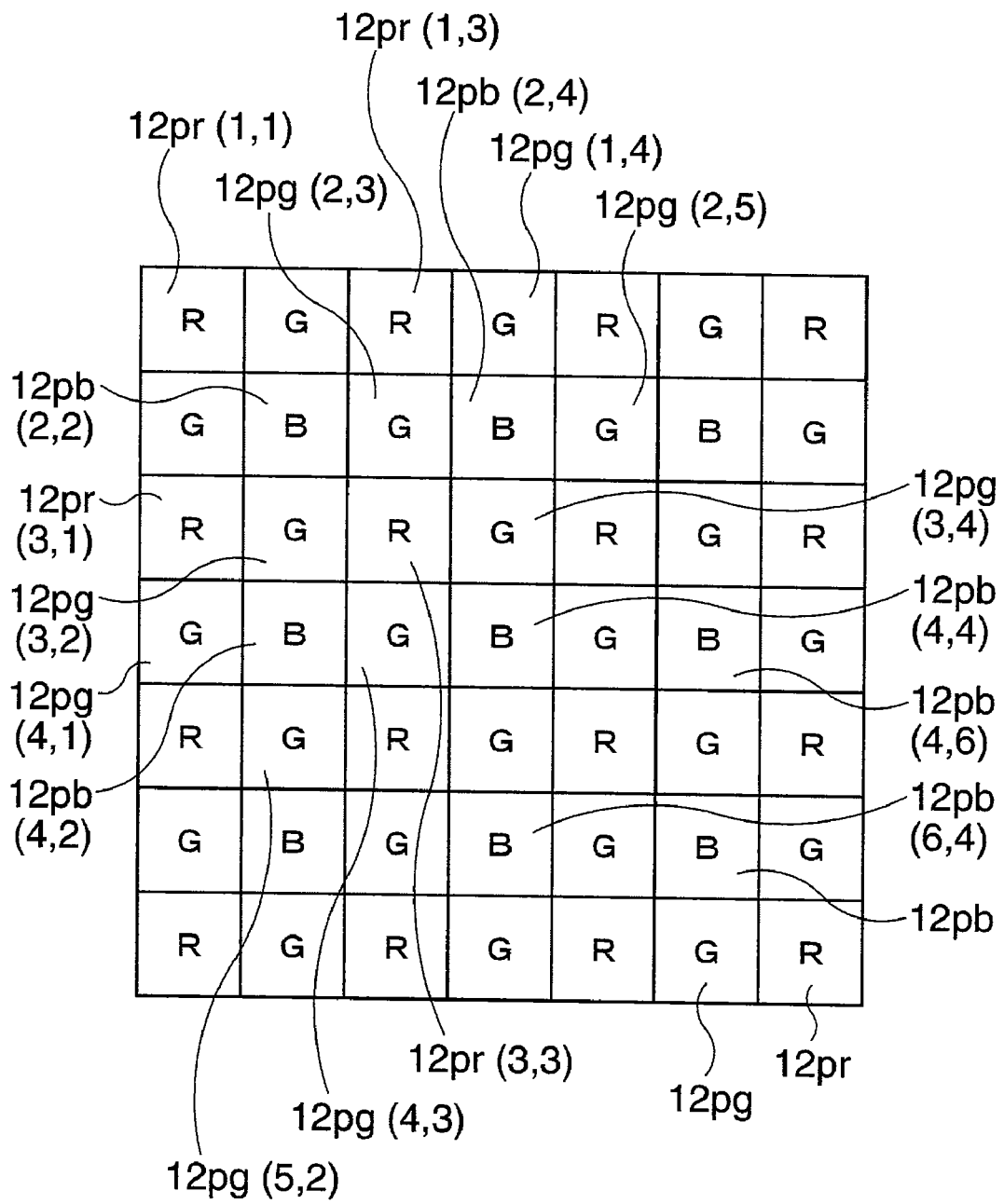
FIG. 3 shows the arrangement of red, green, and blue color filters on a light-receiving surface of an imaging device.
Figure 4:
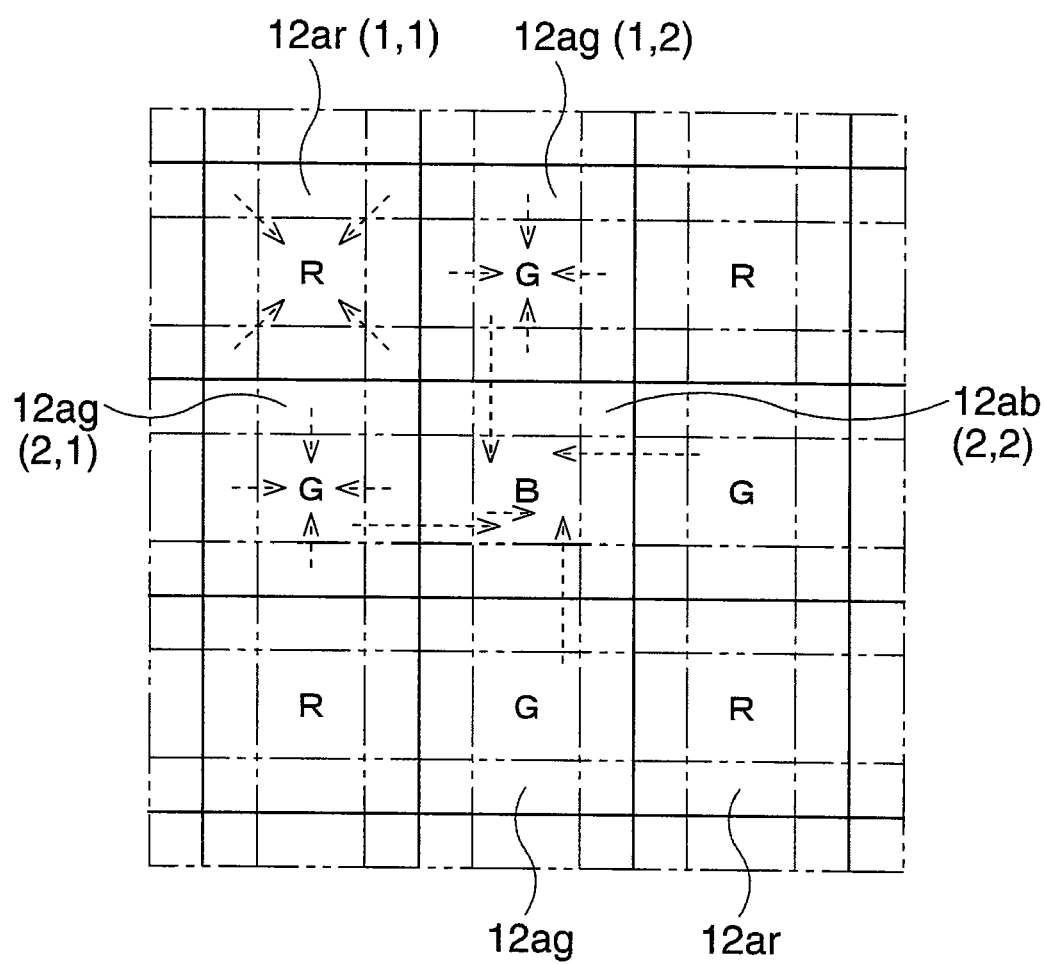
FIG. 4 shows the hypothetical arrangement of red, green, and blue mixed pixel areas.

The pixel mixing process carried out by the DSP 14 is explained below, using FIGS. 3 and 4. Incidentally, the dashed double-dotted lines drawn in FIG. 4 are border lines among the actual red, green, and blue pixels 12*pr*, 12*pg*, 12*pb*. Hereinafter, the pixel which is arranged in the mist row from top and the m2nd column from left side, is referred to as 12*p*(m1,m2). Hereinafter, the mixed pixel area which is arranged in the n1st row from top and the n2nd column from left side, is referred to as 12*a*(n1,n2).

In the pixel mixing process, a mixed image is generated from the original image. Incidentally, the original image is an image comprised of a plurality of red, green, and blue pixels 12*pr*, 12*pg*, 12*pb* where the intensity of red, green, and blue light components accords to the signal intensity of the red, green, and blue pixel signals, respectively. In addition, the mixed image is hypothesized for image processing, and is comprised of a plurality of red, green, and blue mixed pixel areas 12*ar*, 12*ag*, 12*ab*, of which the dimensions are different from those of the red, green, and blue pixels 12*pr*, 12*pg*, 12*pb*.

In addition, the red, green, and blue mixed pixel areas 12*ar*, 12*ag*, 12*ab* correspond to the red, green, and blue pixels 12*pr*, 12*pg*, 12*pb*, respectively. Hypothetical zones of the red, green, and blue mixed pixel areas are arranged on the light-receiving surface according to the Bayer color array.

The red, green, and blue mixed pixel areas 12*ar*, 12*ag*, 12*ab* are each four times as wide as the individual pixels 12*pr*, 12*pg*, 12*pb*. The center of the red mixed pixel area 12*ar* is in agreement with 12*pb*(n1,n2), where n1=4m−2, n2 =4n−2 with m and n being natural number. The center of the green mixed pixel area 12*ag* is in agreement with 12*pb*(n1,n2), where n1=4m−2, n2=4n or n1=4m, n2=4n−2 with m and n being natural number. The center of the blue mixed pixel area 12*ab* is in agreement with 12*pb*(n1,n2), where n1=4m, n2=4n with m and n being natural number.

The DSP 14 generates red mixed pixel data corresponding to a red light component received by the red mixed pixel area 12*ar* based on the red pixel data converted from the red pixel signals. The DSP 14 generates green mixed pixel data corresponding to a green light component received by the green mixed pixel area 12*ag* based on the green pixel data converted from the green pixel signals. The DSP 14 generates blue mixed pixel data corresponding to a blue light component received by the blue mixed pixel area 12*ab* based on the blue pixel data converted from the blue pixel signals.

Incidentally, the red mixed pixel data is generated by mixing the red pixel data of all red pixels 12*pr* whose centers are within the distance corresponding to two pixel lengths from the center of the red mixed pixel area 12*ar*. For example, in FIG. 3 the red mixed pixel data for the 12*ar*(1,1), whose center is in agreement with the 12*pb*(2,2), is generated by mixing together the red pixel data from the 12*pr*(1,1), 12*pr*(1,3), 12*pr*(3,1), and 12*pr*(3,3).

Incidentally, the green mixed pixel data is generated by mixing the green pixel data of all green pixels 12*pg* whose centers are within the distance corresponding to two pixel lengths from the center of the green mixed pixel area 12*ag*. For example, in FIG. 3 the green mixed pixel data for the 12*ag*(1,2), whose center is in agreement with the 12*pb*(2,4), is generated by mixing together the green pixel data from the 12*pg*(1,4), 12*pg*(2,3), 12*pg*(2,5), and 12*pg*(3,4). In addition, the green mixed pixel data for the 12*ag*(2,1), whose center is in agreement with the 12*pb*(4,2), is generated by mixing together the green pixel data from the 12*pg*(3,2), 12*pg*(4,1), 12*pg*(4,3), and 12*pg*(5,2).

Incidentally, the blue mixed pixel data is generated by mixing the blue pixel data of all blue pixels 12*pb* whose centers are within the distance corresponding to two pixel lengths from the center of the blue mixed pixel area 12*ab*. For example, in FIG. 3 the blue mixed pixel data for the 12*ab*(2,2), whose center is in agreement with the 12*pb*(4,4), is generated by mixing together the blue pixel data from the 12*pb*(2,4), 12*pb*(4,2), 12*pb*(4,4), 12*pb*(4,6) and 12*pb*(6,4).

Incidentally, in generation of the blue mixed pixel data for the 12*ab*(2,2), the blue pixel signal generated by the 12*pb*(4,4), which is in agreement with the center of the 12*ab*(2,2), is weighted. For example, assuming the blue pixel signals generated by the 12*pb*(2,4), 12*pb*(4,2), 12*pb*(4,6), 12*pb*(6,4), and 12*pb*(4,4) are B1, B2, B3, B4, and B5, respectively, the blue mixed pixel signal is equal to the following sum; B1+B2+B3+B4+4×B5.

While the red and green mixed pixel signals are generated by the summation of 4 pixel signals, the blue mixed pixel signal is generated by the summation of 4 individual pixel signals and four times a fifth individual pixel signal. Accordingly, to normalize the maximum data level of the blue mixed pixel signal so that it is in agreement with those of the red and green mixed pixel signals, the blue mixed pixel data is multiplied by a coefficient of 1/2 (=4/8).

The pixel mixing process of the above embodiment can be carried out using pixel signals generated by pixels located not only far from the center of the mixed pixel area, but also near to the center of the mixed pixel area as well. Accordingly, it is able to detect more accurate color components in mixed pixel areas, and it is able to decrease the influence of blurring caused by the pixel mixing process.

Pixel signals generated by pixels whose centers are located no further than 2 pixel lengths from the center of the mixed pixel area are used for the pixel mixing process in the above embodiment. However, the distance from the center of the mixed pixel area can be determined to be any length. The longer the distance, the higher the sensitivity to the light received from the individual pixel signals used for the generation of the mixed pixel signal.

The distance between the centers of two adjacent mixed pixel areas is equal to twice the distance between the centers of two adjacent pixels in the above embodiment. However, the distance between two adjacent mixed pixel areas can be determined to be any length. Incidentally, it is preferable to adjust the area for determining what pixel signals are used for the pixel mixing process according to the distance between two adjacent mixed pixel areas.

If the number of pixels used for the pixel mixing process is increased without changing the distance between two adjacent mixed pixel areas, the same pixel signal may be used in the generation of different mixed pixel signals, which may result in blurring. In addition, when the distance between two adjacent mixed pixel areas is extended without changing the number of pixels used for the pixel mixing process, an increase in the amount of unused pixel signals occurs and, consequently, the resolution deteriorates. To avoid these problems, both the number of pixels and the separating distances should be correlated appropriately.

Only the blue mixed pixel signal is multiplied by the coefficient of 1/2 in the above embodiment. However, the red and green mixed pixel signals may also be multiplied by first and second coefficients as long as the first, second, and third coefficients by which the red, green, and blue mixed pixel signals are multiplied, are inversely proportional to the number of red, green, and blue pixels used in the pixel mixing process, respectively. In the above embodiment, four red pixel signals, four green pixel signals, and eight blue pixel signals including weighted pixel signals, are used in the generation of a mixed pixel signal for each color. Consequently, the ratio of the first, second, and third coefficient is decided to be 1/4:1/4:1/8, in such a case. Incidentally, the number of red and green mixed pixel signals is not multiplied in the above embodiment because the red and green mixed pixel signals have taken on first and second coefficients that have been normalized to the value of 1.

4 is used as a coefficient for weighting the blue pixel signal generated by the blue pixel near the center of the blue mixed pixel area. Any other coefficient can be used as long as the coefficient increases as the distance between the center of the blue pixel and the center of the blue mixed pixel area decreases.

Otherwise, the blue pixel signal should not be weighted. Even if any blue pixel signal is not weighted in the above embodiment, the influence of blurring can still be more efficiently mitigated than by that of the prior pixel mixing process.

The centers of the red, green, and blue mixed pixel areas 12$ar$, 12$ag$, 12$ab$ are in agreement with blue pixels 12$pb$ in the above embodiment. However, the centers of the mixed pixel areas 12$ar$, 12$ag$, 12$ab$ can be in agreement with the red or green pixels 12$pr$, 12$pg$.

On the other hand, the centers of the mixed pixel areas 12$ar$, 12$ag$, 12$ab$ may not be in agreement with the centers of any pixels. If the center of the mixed pixel area is arranged elsewhere, an effect similar to that of the above embodiment can be achieved as long as the color mixed pixel areas are arranged according to the same pattern as that of the color pixels.

The color pixels of the imaging device 12 are arranged according to the Bayer color array in the above embodiment. However, the pixels can be arranged according to the Interline array, the striped green and interleaved red and blue pattern, and the striped green and checkerboard red and blue pattern. In addition, other color filter arrays are adaptable except for the color filter array where the number of red pixels within an area of which the length and width are predetermined and whose center is in agreement with one red pixel; the number of green pixels within an area of the same length and width as those of the red pixel and whose center is in agreement with one green pixel; and the number of blue pixels within an area of the same length and width as those of the red pixel and whose center is in agreement with one blue pixel; are equal to each other, such as in the stripe array.

Three primary color filters are used in the above embodiment, however, other color filter can be used. In addition, any numbers of color filters can be used. For example, four complementary color filters can be arranged according to the complementary-color-difference line-sequential type.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-081246 (filed on Mar. 23, 2006), which is expressly incorporated herein, by reference, in its entirety.

The invention claimed is:

1. An image signal processor, comprising:
  a receiver that receives first, second and third color pixel signals output from an imaging device, said first, second and third color pixel signals being generated by first, second and third color pixels according to magnitudes of first, second and third color light components received, respectively, said first, second and third color pixels being arranged on a light receiving surface of the imaging device according to a predetermined color array, distances from the third color pixel to the nearest first color pixel, from the third color pixel to the nearest second color pixel, and from the third color pixel to the nearest other third color pixel being different from each other;
  a mixing block that generates first, second and third color mixed pixel signals, said first, second and third color mixed pixel signals corresponding to a magnitude of the first, second and third color light components received by first, second and third color mixed pixel areas, respectively, said first, second and third color mixed pixel areas arranged so that said first, second and third color mixed pixel areas occupy spaces in accordance with said predetermined color array, and so that the centers of said first, second, and third mixed pixel areas coincide with different ones of said third color pixels, said first color mixed pixel signal being generated by mixing said first color pixel signals generated by a plurality of said first color pixels nearest to said third color pixel that coincides with a center of said first color mixed pixel area, said second color mixed pixel signal being generated by mixing said second color pixel signals generated by a plurality said second color pixels nearest to said third color pixel that coincides with a center of said second color mixed pixel area, and said third color mixed pixel signal being generated only by mixing together a central third color pixel signal generated by a central third color pixel that coincides with a center of said third color mixed pixel area, with said third color pixel signals generated by four said third color pixels nearest to said central third color pixel and surrounding said central third color pixel, wherein said third color mixed pixel signal is calculated by a summation of each said third color pixel signals generated by the four said third color pixels nearest to said central third color pixel and surrounding said central third color pixel, and four times said central third color pixel signal, the summation then being multiplied by a coefficient of one-half; and an adjustment block that adjusts the signal levels of said first, second and third color mixed pixel signals based on first, second and third pixel numbers used for the generation of said first, second and third color mixed pixel signals, respectively.

2. An image signal processor according to claim 1, wherein said predetermined color array is the Bayer color array.

3. An image signal processor according to claim 1, wherein said adjustment block adjusts said signal levels by dividing said first, second, and third mixed pixel signals by said first, second, and third pixel numbers, respectively.

4. An image signal processor according to claim 1, wherein said adjustment block adjusts said signal levels by multiplying said first, second, and third mixed pixel signals by first, second, and third coefficients, respectively, and a ratio of said first, second and third coefficients are the reciprocals of said first, second, and third pixel numbers, respectively.

5. An image signal processor according to claim 1, wherein said third pixel number is different from said first and second pixel numbers which are equal to each other, and said adjustment block adjusts said signal level of said third mixed pixel signal by multiplying said third mixed pixel signal by said first pixel number and by the reciprocal of said third pixel number.

6. An image signal processor according to claim 1, wherein said mixing block generates said first, second, and third color mixed pixel signals by weighting said first, second, and third pixel signals generated by said first, second, and third color pixels, according to an inversely proportional relationship with respect to the distances between said first, second, and third color pixels and the centers of said first, second, and third color mixed pixel areas, respectively, and said adjustment block adjusts said signal level by applying said weights of said first, second, and third color pixel signals to said first, second, and third pixel numbers.

7. The image signal processor according to claim 1, wherein a number of pixel signals utilized for generating said first, second and third color mixed pixel signals varies with color.

8. An image signal processor, comprising:

a receiver that receives first, second, and third color pixel signals output from an imaging device said first, second, and third color pixel signals being generated by first, second and third color pixels according to the magnitudes of first, second, and third color light components received, respectively, said first, second, and third color pixels being arranged on a light-receiving surface of the imaging device according to the Bayer color array;

a mixing block that generates first, second, and third color mixed pixel signals, said first, second, and third color mixed pixel signals corresponding to the magnitude of said first, second, and third color light components received by first, second, and third color mixed pixel areas, respectively, said first, second, and third color mixed pixel areas being arranged so that said first, second and third color mixed pixel areas occupy spaces in accordance with the Bayer color array and so that the centers of said first, second and third color mixed pixel areas coincide with different third color pixels, said first mixed pixel signal being generated by mixing said first color pixel signals generated by a plurality of said first color pixel nearest to said third color that coincides with the center of said first color mixed pixel, said second color mixed pixel signal being generated by mixing said second color pixel signals generated by a plurality of said second color pixels nearest to said third pixel that coincides with a center of said second color mixed pixel area, said third color mixed pixel signal being generated only by mixing together a central third color pixel signal generated by a central third color pixel that coincides with a center of said third color mixed pixel area with said third color pixels signals generated by four said third color pixels nearest to said central third color pixel and surrounding said central third color pixel, wherein said third color mixed pixel signal is calculated by a summation of each said third color pixel signals generated by the four said third color pixels nearest to said central third color pixel and surrounding said central third color pixel, and four times said central third color pixel signal, the summation then being multiplied by a coefficient of one-half, first, second, and third pixel numbers being numbers of said first, second, and third color pixels used for the generation of each of said first, second, and third color mixed pixel signals, respectively, and an adjustment block that adjusts the signal levels of said first, second, and third color mixed pixel signals based on the first, second, and third pixel numbers.

* * * * *